April 14, 1942. G. A. OVERSTROM ET AL 2,279,742
BALANCED SCREENING STRUCTURE
Filed May 21, 1940    5 Sheets-Sheet 1

INVENTORS
GUSTAVE A. OVERSTROM,
GEORGE OVERSTROM,
BY CONRAD OVERSTROM,
ATTORNEYS

April 14, 1942.    G. A. OVERSTROM ET AL    2,279,742
BALANCED SCREENING STRUCTURE
Filed May 21, 1940    5 Sheets-Sheet 5

INVENTORS
GUSTAVE A. OVERSTROM,
GEORGE OVERSTROM,
BY    CONRAD OVERSTROM,
ATTORNEY.

Patented Apr. 14, 1942

2,279,742

UNITED STATES PATENT OFFICE 2,279,742

BALANCED SCREENING STRUCTURE

Gustave A. Overstrom and George Overstrom, Eagle Rock, and Conrad Overstrom, Altadena, Calif.

Application May 21, 1940, Serial No. 336,346

13 Claims. (Cl. 209—315)

This invention relates to balanced screening structures.

The object of the invention is to provide a screen structure in which the forces of the moving structures balance each other.

A further object is to provide a balanced screen structure in which the shaking frames are subject to non-reversible stresses from end to end, whereby frame crystallization and wrecking is prevented.

A further object is to provide a screen structure in which no reversal of stresses occurs in the connections from the vibrating mechanism to the frames.

A further object is to provide a screen structure in which the spring supports do not pass a neutral axis.

A further object is to provide a balanced screen structure in which the vibrating frames are independently subject to non-reversible stresses.

A further object is to provide a balanced structure which is positive in its operation and not subjected to diminished travel due to an overload on the screen deck.

Another object is to prevent objectionable knocks in the driving mechanism by the provision of ball and socket joint connections between the screen decks and the driving mechanism.

A further object is to provide a drive mechanism to operate leg supported screen decks that are under constant stress and in running balance from a common rock shaft.

A further object is to provide means to operate leg supported screen decks from a common rock shaft without stress reversals in the mechanism driving the rock shaft or in the connections from the rock shaft to the end of the screen decks.

A further object is to provide means to compensate for the side sway in leg-supported vibrating screen decks.

A further object is the provision of a balanced screen structure in which the pulling forces that operate the screen deck are applied in substantially parallel and horizontal lines, thereby balancing every force in the cycle of revolution of the operating shaft.

Other objects of the invention will appear more fully hereinafter.

This invention resides substantially in the combination, construction, arrangement and relative location of parts, all in accordance with this disclosure.

Referring to the accompanying drawings.

Like parts are indicated by like symbols throughout the specification and drawings.

Serious difficulties have heretofore been encountered in attempting to balance large-size screens supported on spring legs. In some of the prior art screens of this general type, a reciprocating vibrating weight to balance the screen box, containing one or more screen decks, is employed and the driving mechanism floats with this weight. It has been observed that when the screen box receives an overload its vibratory movement is diminished while the reciprocatory movement of the balance weight member is augmented; thus the velocity of travel of the load slows down, and the depth and weight of material on the screen box decks increase because of lack of screening throw. This in turn causes the vibrating weight to still further increase its movement and in like proportion to decrease the movement of the screening box until it becomes and remains stationary and inoperative while the vibrating weight is reciprocating back and forth the full stroke. Screens of the type mentioned have the very serious objection of not being positive in the operative cycle, and that reversal of stresses is present for each stroke, causing destructive wear which often causes serious breakages in the structure.

These difficulties are overcome by the structures of the invention herein disclosed. In part, by reason of the arrangements of the spring legs which support the screen boxes or by auxiliary springs, these spring legs, which are transversely resilient, interconnect the screen boxes with the base in such a manner that they are adjustably stressed to the extent that for all movements of the screen boxes during use they never pass through a neutral axis, but at all times produce a stress only in one direction, sufficient to eliminate all lost motion. The screen boxes are also connected to a stationary driving mechanism by positive connections and the spring legs are stressed against the resistance of these connections, so that all parts are stressed in one direction only. The stress on the legs and auxiliary springs is adjusted to be sufficiently great so that even if all joints were open there can be no lost motion in them, and when there positively is no lost motion there is no stress reversal in the screen boxes, or in their driving mechanism.

In other prior art screens of this general class, considerable difficulty has been caused by the unequal angularity of pull between the driving mechanism and the screen boxes. This makes it impossible to produce a fully balanced structure. To overcome this difficulty, we have provided a mechanism in which the pull to both the screen boxes is exerted in a substantially parallel and horizontal direction, and in actual practice this has reduced the stresses caused from unbalanced forces in the screen boxes proper. We have found that, by providing a mechanism in which the pull to two balanced reciprocating structures is practically parallel and horizontal, we reduce the vibrations transmitted to the foundation or base that supports the structure, especialy at the drive mechanism end. In prior art so-called balanced reciprocating structures, no provision is made for taking up lost motion in the mechanism or preventing stress reversals in the mechanism or reciprocating structures. Hence, when wear takes place in the joints, lost motion causes serious knocks and destruction of the whole structure. We eliminate stress reversals and lost motion by our improved construction.

We provide a screen structure in which practically no vibration is transmitted to the base, and as a consequence of which the efficiency of the screening and cleaning action is vastly superior to prior art screens. We employ, for example, a fixed base or support which in practice vibrates so little that it does not have to be bolted to the floor; and in actual practice in running a full size machine, not bolted to the floor or foundation, there is so little horizontal and vertical vibration that a standard half-inch pipe, three feet long, when placed on the base frame either at the feed of discharge end of the screen will stand upright on its end during the running, stopping, and starting of our screen structure.

We have found from practice that to successfully operate and balance large size reciprocating screens presented a serious problem, particularly so when the frames of the screen decks were subject to alternate tension and compression. Stress reversals of this character will wreck a vibrating frame of the stoutest material, and likewise stress reversals will cause knocking and rapid wear of moving parts of the driving mechanism that reciprocates the boxes. To overcome this difficulty, we have found that the screen box and mechanism must not be subjected to stress reversals. This stress may be either tension or compression, and must be continuous from end to end of the structure. In short and wide structures it is immaterial whether the stress be tension or compression; but in large size long structures our preference is to subject the boxes to tensional stresses, because the frames then can be made lighter. However, as far as the actual operation of the screen goes, in large size screens, the stresses can be compression, provided the strength of the frames is increased enough to prevent buckling.

In order that no stress reversals occur, of course, the stress throughout the screen boxes must be in the same general direction at all times regardless of the movement of the boxes, that is, regardless of whether the boxes move forward or backward.

We prefer to provide a plurality of upwardly inclined spring legs, generally indicated at 5 on the drawings. These flexible spring supports are of the type illustrated by Patent No. 2,062,760, granted to Gustave A. Overstrom, on December 1, 1936. The springs and their manner of fastening are not shown here in great detail, but the fastenings and manner of use are well illustrated in the above-mentioned patent. We arrange our flexible spring supports in such a manner that the springs never pass through a neutral position, but are so arranged as to create a continuous stress in one direction throughout the entire screening operation. In general, we prefer to make the inclination of the spring legs between 54 degrees and 60 degrees.

The one way stresses in the mechanism and in the screen boxes are maintained by the force in all the spring legs, or in auxiliary springs exerting their pressure throughout the whole length of the screen boxes to the driving mechanism. It is usually more convenient to place the feed end opposite to the head motion end so that the discharge end of the screen is at the head motion end. This arrangement allows of lighter spring legs and screen boxes being used, because the weight of the screen boxes and their loads aid the spring legs in keeping the reciprocating structures in tension. The driving mechanism pulls the screen box and its load upward and forward, and gravity assisted by spring pressure pushes the screen box downward and backward towards the feed end.

In order to obtain fast enough tossing and screening action, the screen runs faster than gravity will carry it back, hence gravity alone is not enough for this purpose, but spring assistance is needed to maintain tension and prevent knocking or hammering in the driving mechanism.

Figure 16:
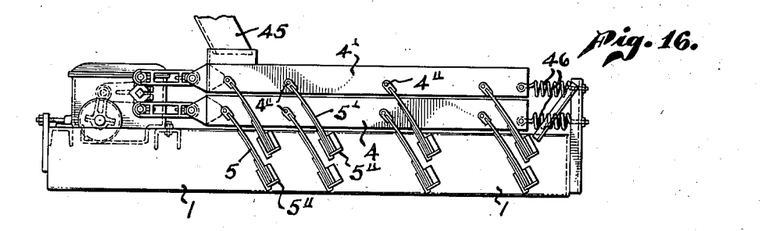
Figure 16 is a side elevation of a screening structure employing the principles of our invention, showing pivoted leg supports and auxiliary tension springs, and having the driving means located at the feed end of the machine, with the reciprocating screen deck structure in tension.

It is readily understood that the head motion can also be placed at the feed end. In that case the spring legs may be more in number or heavier, and placed so that they lift the screen box and the live load; or auxiliary tension springs may be used to assist the spring legs at the discharge end to help keep the mechanism and screen box structure in tension from end to end. Such a structure is illustrated in Figure 16.

Figure 17:
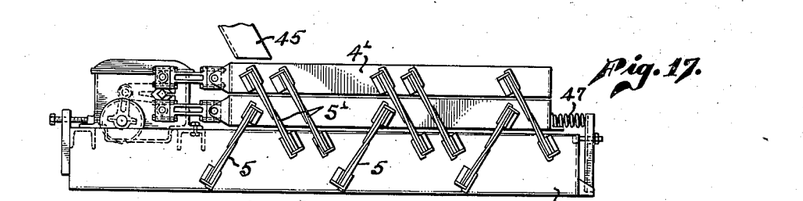
Figure 17 is a side elevation of a screening structure having a similar head motion to that shown in Figure 16, but with the reciprocating screen structures in compression and conveying in opposite directions, and having auxiliary compression springs.

The head motion can also be placed at the feed end, as shown in Figure 17, and spring legs and auxiliary springs used to push the screen box towards the head motion end, in which case the screen box is constructed heavier to take care of the compression and buckling stresses to which the screen box is then subjected.

It is not advisable to have one box in tension and the other in compression, because then there is stress reversal in the head motion and knocking results in the mechanism. The spring pressure is always kept greater on either the upper or the lower screen box frame to effectively take up all lost motion in the mechanism and prevent stress reversal therein.

We have found in practice that the pull to each of the screen boxes should be substantially parallel and in practically a straight line with each screen box. But it frequently happens in the fabrication of large size screening units of this type that inequalities of workmanship occur and there may be more resistance to uniform longitudinal movement on one side of the structure than on the other side. In operation, inequality of feed distribution is also frequent. These inequalities create a slight side sway to the structure. We find it necessary to compensate for this side sway. This sway may be fairly uniform crosswise at both ends of the screen box, that is, a fairly parallel motion. This condition happens frequently where comparatively uniform feed conditions are present, and to compensate for such motion we provide a so-called pantograph connection between the rock arms and the screen box, that is, a ball and socket parallel motion.

But in the case of handling a mixed feed, of tree stumps, boulders, stones and sand, the feed conditions become very erratic and the screen boxes may sway at one end more than another, under constantly reversing conditions. In accordance with this invention we provide a whippletree arrangement as shown in Figures 7 through 11, or its equivalent, to overcome the difficulty. The provision of this whippletree structure allows of a straight equalized pull to each of the screen boxes, compensating for any kind of side sway that may occur, because in addition to the pantograph construction connecting from the rock arms to the ends of the whippletree, we provide a pivot in the whippletree from which the screen box structure can swing sidewise one end more than the other without lightening or increasing the pull on either connecting rod. It may not be amiss to state here, that in spite of having used plenty of stress in our screen structure when using straight bore connecting rods between motion and screen boxes, serious hammering would occur on one side or the other of the connecting rods, because when swaying, one side may get ahead of the other and lost motion occur in one of the links.

In Figures 12 through 15 we have shown another construction in which the side sway of the reciprocating structures is accommodated by only one ball and socket link connection from the head motion to each one of the screen boxes. This construction necessitates a flexible boot on each connecting rod to keep foreign matter out of the head motion oil chamber.

Figure 18:
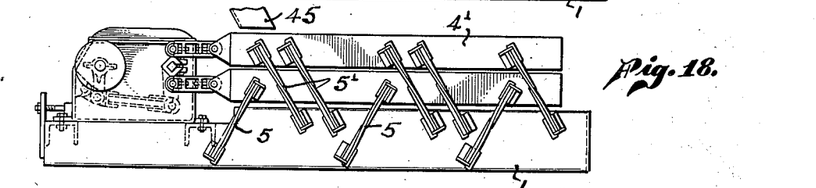
Figure 18 is a side elevation of a screening structure employing the principles of the invention, in which the reciprocating decks are in tension and are actuated by a differential motion mechanism, and the screen decks conveying the material in opposite directions, with the feed at the head motion end.

In the operation of large size screening structures of the leg supported type, it is frequently desirable to have the screening decks move with differential motion. If two independently supported screen boxes move material in the same general direction, then differential motion cannot be imparted to the screen decks from a common rock shaft because of the mechanical impossibility of such a combination. The differential would be upward on one, and down on the other deck. In such a case we impart to the rock shaft a harmonic motion. However, if two independently supported screen boxes move material in opposite directions, then it becomes desirable and possible to cause the decks to move with differential motion through a common rock shaft. Such an arrangement is shown in Figure 18, with feed coming in at the head motion end, and in Figure 19 with feed coming in at the end opposite the head motion end. In this disclosure the term "differential motion" is used to define a motion of the screen box caused by operating members including a crank for example, which when rotating at a uniform angular velocity causes the screen box to move a much greater distance during the last half of its forward stroke and the first half of its return stroke than at the beginning of the forward stroke and the end of the return stroke.

It is obvious that one of the screen decks can be used without the screens being placed therein; the other deck with screens serving the function of a single deck screen. In such a case, enough weight is added to the idle deck to act as the balance means, to effectively balance the screening medium and its sash.

Referring to the drawings, particularly Figures 1 through 6, I indicates any suitable base which may, for example, be formed by generally parallel side members indicated as 2. Any suitable transverse supports or connections indicated as 3 may be employed. The screen boxes in general are indicated at 4 and 4'. Inasmuch as a variety of screen decks may be employed the decks are not indicated in great detail. The screen boxes 4 and 4' are mounted upon the base or support 1 by means of spring legs 5 and 5'. The screen decks are rigidly held in the screen boxes and, as the case may require, may be perforated sheets or woven wire cloth with different size openings as indicated in the drawings at S and S'. We arrange the flexible spring supports in such a manner that the springs never pass through a neutral position, but are so arranged as to create a continuous stress in one direction throughout the entire screen box. In general, we prefer to make the inclination of the spring legs between 54 degrees and 60 degrees. As indicated in these figures, the ends of the spring legs are rigidly secured to the decks and base.

We mount the case 6 of the vibrating mechanism, often called Head Motion in the field, on the base support 1. This is slidably held to the base by means of any suitable fastening which will allow sliding adjustment of it on the base when the fastening means, such as bolts, are loosened. The screen decks 4 and 4' carry brackets 7 and 7' through which shafts 8 and 8' are transversely disposed at the centers of the connecting rods 9 and 9'. There are four connecting rods, two on each side, which connect the driving mechanism to the screen decks. Upon the transverse tie member 3 we mount a bracket 10. Stud 11 passes through this bracket and is fastened in the housing member 6. By suitable adjustment of the nut 12, we adjust the vibrating mechanism longitudinally to create the desired amount of stress in the spring legs 5 and 5'. It will be readily understood that an adjustment of the vibrating mechanism to the right will be resisted by the multiple spring supports so that the desired stress can be obtained.

Journalled within casing 6 in bearings 17' is a rock shaft 13 to which a lever arm 14 is suitably fastened. Pivoted to the opposite end of the arm 14 is a pitman 15. The pitman connects the arm 14 to the crank member 16. Crank shaft 16 is journalled within the casing 6 and provided with flywheels 25. The ends of the rock shaft 13 are preferably made square, and to these square ends are fastened double levers 17.

Figure 1:
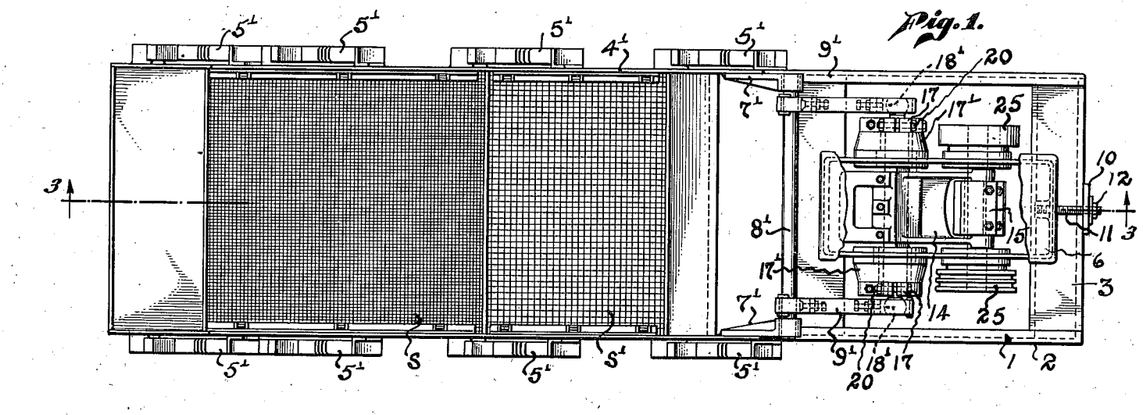
Figure 1 is a view in top plan, parts broken out, of a screening structure embodying the principles of our invention.
Figure 2:
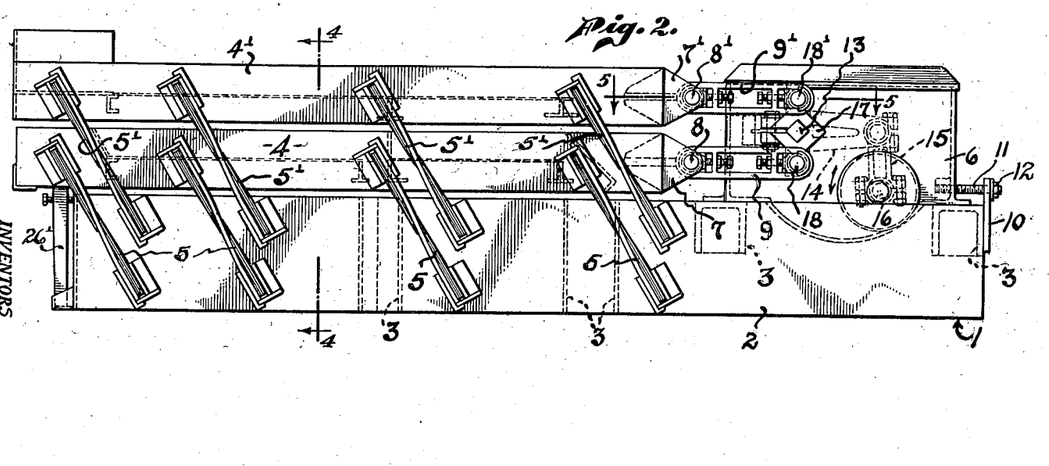
Figure 2 is a view in side elevation of the same.
Figures 3, 4, 5, 6:
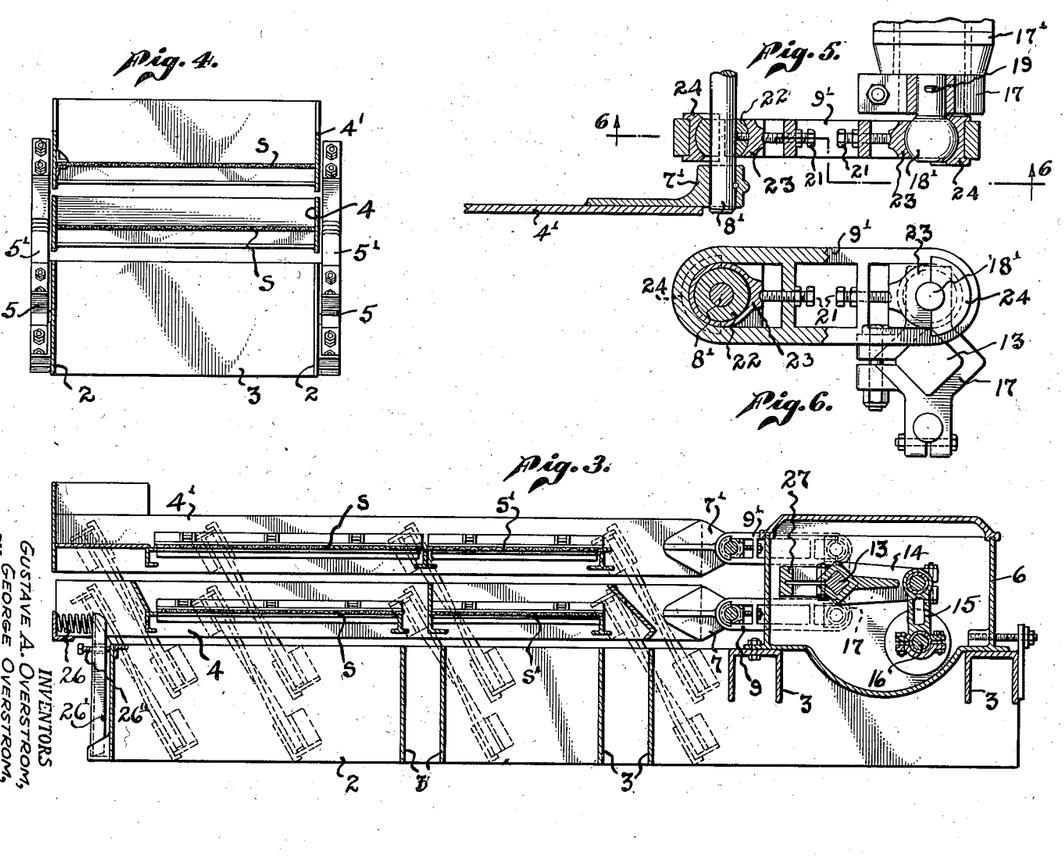
Figure 3 is a vertical, longitudinal section of the screening structure taken along the line 3—3 of Figure 1.
Figure 4 is a transverse, vertical section of the screening structure taken along the line 4—4 of Figure 2.
Figure 5 is an enlarged, horizontal, sectional detail of the connections for the driving mechanism for the upper screen taken along the line 5—5 of Figure 2.
Figure 6 is a partial vertical section taken along the line 6—6 of Figure 5.
Figure 7:
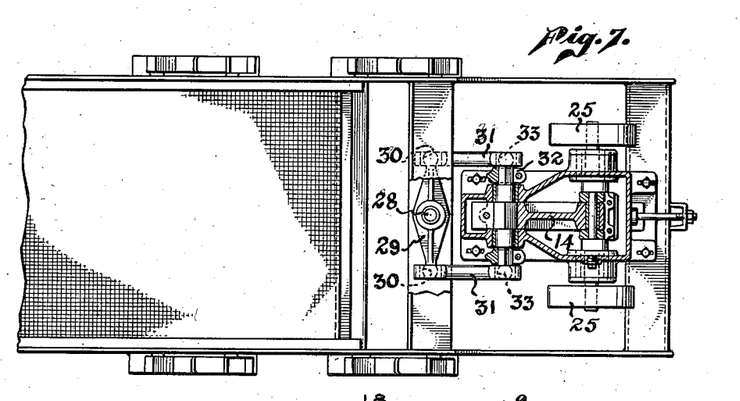
Figure 7 is a view in top plan, partially in section along the line 8—8 of Figure 8, parts broken out, showing a variation of a screen structure employing a whippletree driving connection with our invention.
Figure 8:
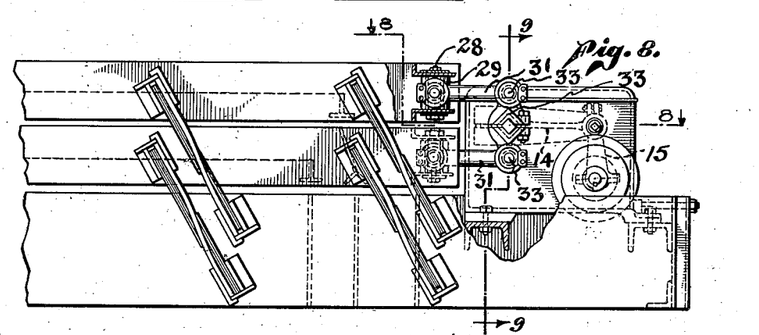
Figure 8 is a view in side elevation of the same with parts broken out and parts in cross-section.
Figures 9, 11:
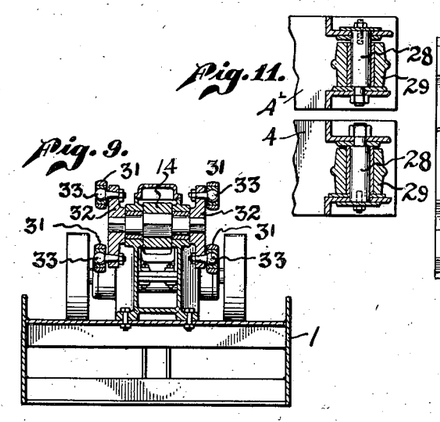
Figure 9 is a transverse, vertical section of the screening structure taken along the line 9—9 of Figure 8.
Figure 11 is an enlarged, vertical, sectional view taken through the longitudinal center line of the whippletrees.
Figure 10:
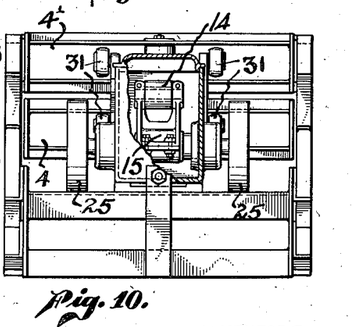
Figure 10 is an end elevation looking at the head motion end of Figure 8 with parts broken out.

Referring to Figure 3 of the drawings, it will be seen that the arm 14 is so proportioned that the distance between the center of the rock shaft 13 and the center of the pitman 15 is longer than the distance between the center of the rock shaft 13 and the center of the ball pintles 18 and 18' at the respective ends of levers 17, where the connecting rods 9 and 9' are attached thereto.

Referring to Figure 4 of the drawings, this figure shows a typical cross-section of the vibrating decks.

Referring to Figure 5 of the drawings, in practice we have found it necessary to have ball and socket, or universal joint, connections between the moving members. Experience has shown that when these connections are not made of a ball and socket nature, hammering sets up in the joints. This hammering can be due to many causes, for example, side sway in the operating decks, inequality of workmanship, etc.; and by means of the ball and socket joints we are enabled to overcome this hammering.

We mount in bores in members 17 the ball pintles 18 and 18'. We provide a slot 19 on the surface of each member 18 and 18' so that the bolts 20, which clamp them in levers 17 and 17', will provide an effective means of keeping members 18 and 18' from any endwise movement as bolts 20 clamp the circumferences of the members 18 and 18'. The connecting rods 9 and 9' are provided with two bridges through which bolts 21 pass. Upon shafts 8 and 8' are mounted the ball members 22, and we provide split socket members 23 and 24 at both ends of the connecting rods to form with the members 18 and 18' and 22 ball and socket connections. It can readily be seen that by tightening on the screw 21 the half socket 23 is held in solid contact against half socket 24, but half socket 23 is not pressing against the ball, there being a slight clearance between these two, see Figure 6, but half sockets 24 do press against the balls 18 and 22, because the spring tension from the screen boxes through the connecting rods to the driving mechanism hold these surfaces in intimate contact on both forward and backward strokes.

Half sockets 23 serve only to keep dirt, dust and the like from getting into the ball socket joints. A different rod is used in a compression structure.

In Figure 3 at the left hand end is shown one or more helical compression springs 26 interposed between the end of screen box 4 and a plate 26' supported for swinging movement about its lower edge by the adjusting bolts 26'', which help out in keeping the lower screen box in slightly more tension than that produced in the upper screen box. In case all the spring legs are equal in number and are stressed equally on both the upper and lower screen boxes, there will be some lost motion and stress reversal in the head motion pin joint between the pitman and the lever arm 14. The additional stress produced by the compression springs in the lower screen deck takes away this lost motion. It is mechanically more convenient to apply this additional spring pressure by means of coil springs to the lower screen box than to the upper screen box.

In Figure 3 is shown a counterbalance 27 attached to the lever arm 14 to counterbalance it. On the cheeks of the crank shaft or on the flywheels are counterbalances (not shown) to counteract the centrifugal force produced by the crank and pitman, so as to produce a vibrationless head motion.

The operation of the balanced screening structures is as follows:

A suitable source of power is applied to the crank shaft through one of the flywheels 25, by means of V-belts, for example. The rotation of the crank shaft 16 causes the pitman 15 to move the lever arm 14 in such a manner as to oscillate up and down. The rotation of the crank shaft 16 can be either clockwise or counter-clockwise, but for the most effective splash oiling we prefer to rotate in the direction shown by the arrow, Figure 2. Since member 14 is firmly clamped to rock shaft 13 by means of clamping bolts, the rock shaft is caused to oscillate. The member 17 is firmly connected to member 13 and oscillates back and forth, and this oscillation is imparted to the screen boxes by the horizontal pull through the connecting rods 9, one deck moving back as the other deck moves forward; both decks operating to convey material in the same direction, and both boxes are under constant stress in the same direction, during the whole working cycle, due to the spring pressures exerted from end to end between the head motion and the screen boxes.

In the type of machines shown in Figures 1 to 6, with the connecting rods pulling on the screen boxes at each side of the box, it will be understood that this construction will only accommodate a side sway of the screen boxes that moves in parallel lines, where the sway at the feed end is about equal to that at the discharge end and in the same direction at the same time; in other words, approximately a pantograph motion. Where the feed and working conditions are fairly uniform, this style of construction performs very well and there is no knocking in the connecting rods. But under very severe and erratic working conditions the reciprocating screen boxes have a tendency to sway sidewise, sometimes more at one end than the other, sometimes in opposite directions at the ends, depending upon how the feed of boulders, big stones, tree stumps, etc., may land on one side or the other of the screen; and when such conditions are encountered we prefer to use the style of screen apparatus shown in Figures 7 through 11, or Figures 12 through 15, in both of which types the connection from the head motion to the reciprocating screen boxes is a universal joint or ball socket connection to a single point on each screen box located on the center longitudinal vertical plane of each box.

In Figures 7 through 11 we have shown what we term our whippletree type. The head motion, except as to minor details, is the same in principle as that previously described, and the description need not be repeated. But the connections to the reciprocating screen boxes differ, so as to allow for any kind of side sway. Therefore, at the end of each screen box and in the central longitudinal vertical plane we place the pivot pin 28 of a whippletree 29, the two ends of which terminate in balls 30, to which are attached the socket ends of the connecting rods 31, which may differ in detail or be like connecting rods 9 shown in Figure 6. The double lever arms 32 with their attached ball pintles 33 may differ in detail or be like lever 17 and ball pintle 18 in Figures 5 and 6. It can readily be seen that in this construction, no matter how the screen boxes sway, the stress on each connecting rod will be equal, and one cannot be ahead or lag behind the other to cause knocking.

In Figures 12 through 15 we show another construction in which the same object is accomplished. In this construction we use only one ball and socket connecting rod to each screen box placed in the longitudinal vertical plane of the reciprocating structure. This is a very excellent and simple construction. As mentioned before, this construction necessitates the use of a flexible boot on each connecting rod to keep foreign matter out of the lubricating oil in the housing. There are operating conditions where damage to such a boot may occur, in which case it is safer to use the whippletree type where all of the connecting rod parts are outside of the housing.

Figure 12:
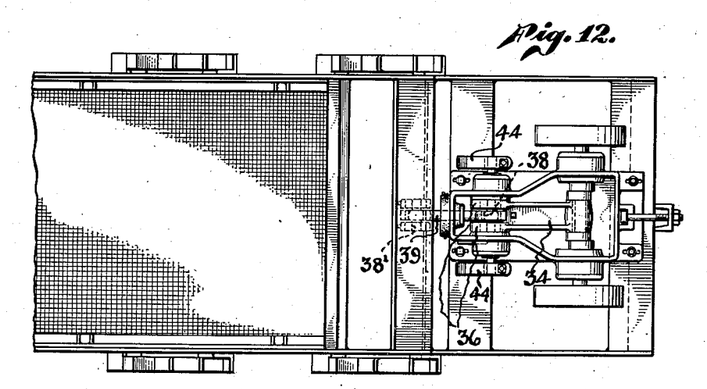
Figure 12 is a plan view of another variation of a screen structure employing the principles of our invention, the cover over the head motion shown removed.
Figure 13:
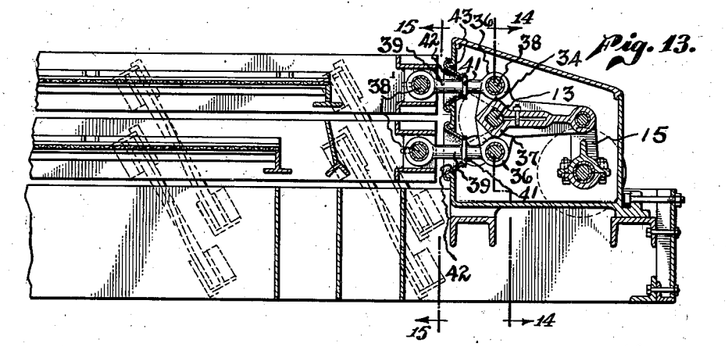
Figure 13 is a vertical, central, longitudinal, sectional view of Figure 12.
Figure 14:
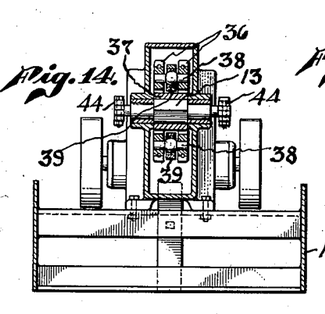
Figure 14 is a vertical cross-section taken on the line 14—14 of Figure 13.
Figure 15:
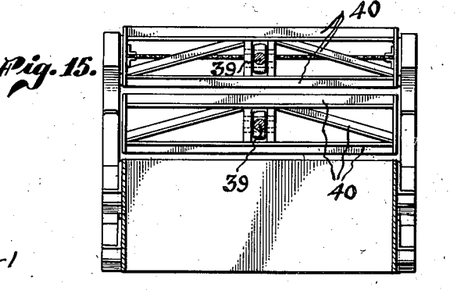
Figure 15 is a vertical section taken on the line 15—15 of Figure 13.

In Figure 12 we use the same kind of crank shaft and pitman 15 as in the before-described types. The upper end of the pitman is pivoted to the horizontal end of a double bell crank 34 which is clamped fast on the rock shaft 35. The vertical parts of the bell crank consist of four ears 36, two below and two above, and equi-distant from the central square clamp hub 37 of the bell crank. In the ears a ball pin 38 is fastened and a socket connecting rod 39 joins each of the bell crank ends to its respective ball pin 38', similar to 38, held centrally to each of the screen box bridge trees 40 which are fastened to the screen box sides.

On each connecting rod 39 is an enlargement 41 to which one end of the flexible boot 42 is fastened, while the other end of the boot is secured to a bead 43 on the head motion housing. The horizontal part of the bell crank 34 is balanced by counterweights 44, fastened to rock shaft 35, one at each end thereof. The crank shaft and pitman are balanced as mentioned before.

In all of the screen structures shown in Figures 1 through 15, we have shown our preference for a type of leg support in which the gravity of the screen box and the pressure of the springs oppose the pull of the head motion and thereby keep all in tension from end to end; and we have also shown the head motion at the end opposite the feed end because in the majority of installations the screen is fed from an elevator or conveyor, and the head motion is thus not in the way of such machinery.

But there are some installations in which it is more convenient to have the feed come in at the head motion end, and such cases are indicated in less detail in Figures 16, 17 and 18.

In Figure 16 we indicate a screen having two screen boxes 4 and 4' balancing each other and driven by a harmonic motion, and conveying in the same direction. The spring legs 5 and 5' are held at their lower ends in the clamp brackets 5'', and their upper ends are pivoted to pintles 4'' fastened on the sides of the screen boxes. The spring legs 5 and 5' in this arrangement are inclined toward the head motion. The feed comes in at the head motion end at 45. Auxiliary helical tension springs 46 are shown to assist in keeping the structure in tension and eliminate lost motion. This type of machine is suitable where long stroke and slower speed is desirable in handling very coarse material, because such spring legs will stand a longer stroke without breaking than the asymmetrical springs shown in the other figures, which springs are suitable for shorter stroke and higher speed.

In the screening structures shown in Figures 1 through 16 we have shown both the upper and the lower screen decks tossing and conveying in the same direction, and the momentums of the screen boxes are balanced because when one box travels forward the other box travels backward, the tossing action being timed about 180° apart. It is immaterial if the feed comes in at the head motion end or opposite thereto. In all this structure the parts are in tension.

In Figures 17 through 21 we have shown the upper deck tossing and conveying in the opposite direction from that of the lower deck, no matter if the head motion is at the feed end or opposite thereto. Here the tossing action occurs on both decks at the same instant, but the tossing being in opposite directions the momentums of the screen boxes balance each other.

Common to all structures in Figures 1 to 21 is an adjusting screw between the head motion and the base frame, for the purpose of properly adjusting the spring pressure, for either tension or compression, that takes up all lost motion in the mechanism, and at the same time prevents stress reversal in the screen box frames from end to end thereof. Common to all is also that the spring stress, whether from spring legs or coil springs, is always in the same direction, both in the upper and the lower screen box structure.

At this point it may be well to note that, as will be apparent to those skilled in the art, this invention is not limited to use with boxes having perforated bottoms to perform screening action. The invention is equally well adapted to conveying apparatus in which the screen boxes or their equivalent would have imperforate bottoms. It is likewise within the scope of this invention to apply it to double-deck concentrating tables, likewise well known in this art.

In the structure of Figure 18, the arrangement is quite similar to that of Figure 17, but in this case the compression springs 47 are omitted. The head motion, as before, is located at the feed end but in this arrangement the driving mechanism is of the type which produces a differential motion. In this arrangement, however, the spring legs are stressed, by their attachment to the base and screen box so as to place the parts under tension. The relative total strength of the sets of springs 5 and 5' is proportioned so that compensation is made for the fact that the effective gravity and the load in the upper deck tend to oppose the springs 5' while in the lower deck the gravity of box and load tend to aid the spring legs 5. With this arrangement the material is conveyed away from the head motion on the upper deck while on the lower deck it is conveyed towards the head motion.

Thus with this arrangement there is provided a pair of balanced screen boxes supported and driven so that they convey material in opposite directions while being operated from a single rock shaft driven by a differential motion mechanism.

Figure 19:
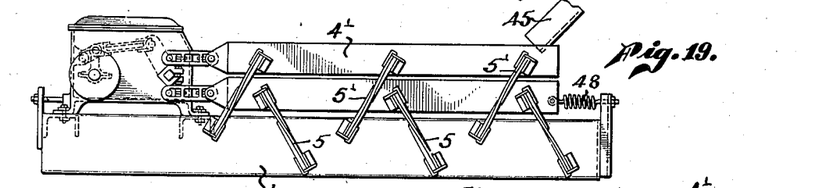
Figure 19 is a side elevation of screening structure employing the principles of our invention, in which the material is conveyed in opposite directions by means of a differential head motion; the feed coming to the screen being at the opposite end to the driving mechanism; the screen deck structures being in tension and having auxiliary tension springs.

In the arrangement of Figure 19 there is shown a balanced screening structure operated by a differential motion mechanism in which the feed to the screen is at the end opposite to that of the head motion. The material on the upper deck is conveyed towards the head motion while the material on the lower deck is conveyed away from the head motion. A supplemental tension spring 48 is connected to the lower screen box to assist the spring legs 5 which support that box. In this arrangement the effective gravity and the load on the upper deck will assist the spring legs 5' in keeping the box 4' in tension while the flexible spring supporting legs 5 for the lower box, not being so assisted, are supplemented by the auxiliary tension springs 48. With this arrangement all parts are kept in tension and all lost motion is taken up.

Figure 21:
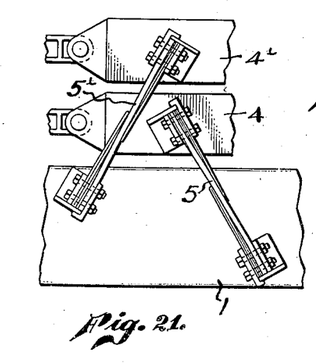
Figure 21 is an enlarged side elevation of the spring leg supports for the screen boxes shown in Figure 19, at the mechanism end, parts broken out.

There is illustrated in Figure 21 on a larger scale the manner in which the spring legs 5 and 5' are placed to produce the correct stresses in the structure of Figure 19. The stress in these spring legs is indicated by the curvature of the central members thereof, as indicated in Figure 21. The disclosure in this figure, plus the previous description, will clearly indicate to those skilled in the art how compression or tension in the structure for the various arrangements illustrated is accomplished.

Figure 20:
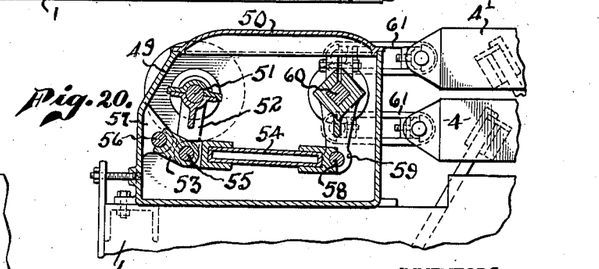
Figure 20 is an enlarged, longitudinal section of the differential driving mechanism of Figures 18 and 19.

Referring to Figure 20, this is an enlarged detail of a typical differential motion mechanism, for example, such as would be employed to operate the screening structure of Figure 18. The differential head motion here shown is well known in the art and is described in the patents to Gustave A. Overstrom, Nos. 2,136,951 and 2,157,562.

In general, the differential motion mechanism consists of a casing 49 and a lid 50. Within the casing there is journalled crank shaft 51, and to the crank shaft there is attached a pitman 52. There is secured to the lower end of pitman 52 a short toggle or rocker 53 and a long toggle 54 by pivot pin member 55. One end of the small toggle 53 bears against pin 56, which is fastened to bracket 57, disposed within the casing 49. One end of the long toggle 54 bears against pin member 58 which is secured to the lower extremity of the arm 59. Arm 59 is rigidly clamped to rock shaft 60. Rock shaft 60 is supported by casing 49 and rotatably mounted for oscillation. Thus it will be seen that when the crank shaft 51 rotates, differential motion will be imparted to the arm 59 through the pitman and toggles, and also to rock shaft 60 because arm 59 is rigidly clamped to shaft 60. This differential motion is in turn imparted to the screen boxes in substantially horizontal lines through the connecting rods 61, one end of each rod being secured to the screen boxes with ball and socket connections as before and the other end fastened as before to the ball members carried upon double arm 62, which in turn is clamped to the rock shaft.

In balanced screening structures such as are illustrated throughout, whether the screening structure is operated by a harmonic motion, or a differential motion, or whether or not the structure is in tension or compression, there are definite characteristics common to all the structures; that is, force is applied to the balanced structures in substantially horizontal lines; and the stress in both screen boxes of the screening structure is in the same direction; and the motion is imparted to both screening decks from a common rock shaft. In all of the structures illustrated throughout, the motion originates at a revolving crank shaft from which it is finally transmitted to a rock shaft, which in turn sets two oppositely balanced screen boxes into reciprocating motion at an angle inclined to the plane of the screen decks.

It is hardly necessary to point out that the supporting legs for the screen boxes need not be resilient but need only be flexible to serve a supporting function, the lack of resiliency thereof being compensated for by the use of springs properly attached to the screen boxes to place them under tension or compression, depending upon which type of structure is to be employed. Likewise as suggested by the structure of Figure 16, the supporting legs may simply be links pivotally attached to the base and respective boxes, tension or compression forces being created by the proper use of springs acting between fixed supports and the respective screen boxes.

We have described herein a number of embodiments of our invention for the purpose of giving a full and adequate disclosure thereof. These various modifications have been given, however, in an illustrative sense with the result that other physical embodiments of the principles of this invention will now be apparent to those skilled in the art. We do not, therefore, desire to be strictly limited to the disclosure but rather to the scope of the claims granted us.

What we claim is:

1. In a mechanism of the type described, the combination including a base, a pair of screen boxes positioned one over the other, a plurality of transversely flexible spring legs attached at their respective ends to the base and in sets respectively to the screen boxes, whereby the screen boxes are supported horizontally from the base, a rock shaft supported on the base, means for oscillating said rock shaft, and positive rigid driving connections between the rock shaft and the screen boxes at their feed ends, said driving connections lying in parallel planes and stressing the spring legs so that they do not undergo stress reversal in operation of the mechanism.

2. In a screening mechanism as described, the combination including a base, a pair of screen boxes, transversely flexible spring legs each connected at one end to the base and respectively connected in groups at their other ends to the screen boxes whereby the screen boxes are supported from the base, a rock shaft supported on the base, means for effecting oscillatory movement thereof, a double-ended lever connected to said rock shaft, and positive link connections between the respective ends of said lever and said screen boxes including ball and socket connections lying substantially in the planes of the screen boxes respectively.

3. In a screening mechanism as described, the combination including a base, a pair of screen boxes, transversely flexible legs each connected at one end to the base and respectively connected in groups at their other ends to the screen boxes whereby the screen boxes are supported from the base, a rock shaft supported on the base, means for effecting oscillatory movement thereof, a double-ended lever rigidly connected to said rock shaft, a double-ended lever pivotally mounted on each screen box, and positive driving connections between one end of said first named double ended lever and each end of one of said second named double ended levers and between the other end of said first named double ended lever and each end of the other of said second named double ended levers.

4. In a screening mechanism as described, the combination including a base, a pair of screen boxes, transversely flexible legs each connected at one end to the base and respectively connected in groups at their other ends to the screen boxes whereby the screen boxes are supported from the base, a rock shaft supported on the base, means for effecting oscillatory movement thereof, a double-ended lever rigidly connected to said rock shaft, a double-ended lever pivotally mounted on each screen box, and positive driving connections between one end of said first named double ended lever and each end of one of said second named double ended levers and between the other end of said first named double ended lever and each end of the other of said second named double ended levers, including ball and socket connections between said positive driving connections and the associated double-ended levers.

5. In a screening mechanism as described, the combination including a base, a pair of screen boxes, transversely flexible spring legs each connected at one end to the base and respectively connected in groups at their other ends to the screen boxes whereby the screen boxes are supported from the base, a rock shaft supported on the base, means for effecting oscillatory movement thereof, a double-ended lever rigidly connected to said rock shaft, a double-ended lever pivotally mounted on each screen box, and positive driving connections between one end of said first named double ended lever and each end of one of said second named double ended levers and between the other end of said first named double ended lever and each end of the other of said second named double ended levers, the points of pivotal connection of the double-ended levers on the screen boxes being arranged in the same vertical plane.

6. In a vibrating screen, the combination including a base, a pair of screen boxes, a plurality of transversely flexible spring legs, each fixedly secured to said base at one end and fixedly secured in groups at their ends to said screen boxes respectively to support said boxes from said base, a rock shaft journalled on said base, means for effecting oscillatory movement of said rock shaft, a pair of double-ended levers secured to said rock shaft in transverse spaced relation, and a pair of positive driving connections between one screen box and the same ends of said double-ended levers and a pair of positive drive connections between the other screen box and the other ends of said double-ended levers, said driving connections placing said spring legs under stress so that they are not subjected to stress reversals during operation of said screen.

7. In a vibrating screen, the combination including a base, a pair of screen boxes, a plurality of transversely flexible spring legs, each fixedly secured to said base at one end and fixedly secured in groups at their ends to said screen boxes respectively to support said boxes from said base, a rock shaft journalled on said base, means for effecting oscillatory movement of said rock shaft, a pair of double-ended levers secured to said rock shaft in transverse spaced relation, and a pair of positive driving connections between one screen box and the same ends of said double-ended levers and a pair of positive drive connections between the other screen box and the other ends of said double-ended levers, all of the points of connection between the double-ended levers and the screen boxes, the screen boxes and the positive driving connections, including ball and socket joints.

8. In a positive drive reciprocating mechanism of the balanced type, the combination including a base, a pair of boxes positioned one over the other, a plurality of yielding supports interconnecting each of the boxes with the base independently of the other, a rock shaft supported on the base, means for oscillating said rock shaft, a double-ended lever on said rock shaft, positive drive connections between the lever and the screen boxes, means for maintaining a unidirectional stress in both screen boxes from the rock shaft.

9. In a positive drive screening mechanism of the balanced type, the combination including a base, a pair of screen boxes positioned one over the other, a screen securely fastened in said boxes, a plurality of yielding supports interconnecting each of the screen boxes with the base independently of each other, said yielding supports for one screen box being substantially normal to the supports independently supporting the other box, whereby the screen boxes are arranged for tossing movements in opposite directions, a rock shaft supported on said base, means for oscillating said rock shaft, positive rigid driving connections between the rock shaft and the screen boxes, spring means for maintaining a unidirectional stress in both screen boxes from the rock shaft during opposite movements of said screen boxes.

10. In a positive drive reciprocating structure of the balanced type, the combination including a base, a pair of boxes positioned one above the other, a plurality of yielding supports interconnecting each of the boxes with the base independently of each other, a rock shaft supported on said base, positive drive connections between said rock shaft and each of said independently supported boxes, means for oscillating the rock shaft to produce opposite movements to the boxes, whereby the momentums of the reciprocating structures balance each other, and spring means to maintain a unidirectional, non-reversible stress in the oppositely moving structure.

11. In a positive drive screening mechanism of the balanced type, the combination including a base, a pair of platforms positioned one over the other, a plurality of yielding supports interconnecting said platforms respectively with the base and independently of each other, a rock shaft supported on the base, means for oscillating said rock shaft, positive drive connections between the rock shaft and the respective platforms, and means for maintaining a unidirectional stress in said platforms from said common rock shaft.

12. In a positive drive screening mechanism of the balanced type, the combination including a base, a pair of platforms positioned one over the other, a plurality of yielding supports interconnecting said platforms respectively with the base and independently of each other, a rock shaft supported on the base, means for oscillating said rock shaft, positive drive connections between the rock shaft and the respective platforms, and means for maintaining said platforms in tension.

13. In a positive drive screening mechanism of the balanced type, the combination including a base, a pair of platforms positioned one over the other, a plurality of yielding supports interconnecting said platforms respectively with the base and independently of each other, a rock shaft supported on the base, means for oscillating said rock shaft, positive drive connections between the rock shaft and the respective platforms, and means for maintaining said platforms in compression.

GUSTAVE A. OVERSTROM.
GEORGE OVERSTROM.
CONRAD OVERSTROM.